United States Patent [19]
Drozd

[11] Patent Number: 5,755,071
[45] Date of Patent: May 26, 1998

[54] FLANGE COVER WITH SMOOTH EXTERIOR SURFACE

[75] Inventor: Eric Drozd, Farmington Hills, Mich.

[73] Assignee: The Standard Products Company, Cleveland, Ohio

[21] Appl. No.: 732,034

[22] Filed: Oct. 16, 1996

[51] Int. Cl.[6] .......................... B60J 10/00; B60R 13/02
[52] U.S. Cl. .................. 52/716.8; 52/716.6; 49/490.1; 49/498.1; 428/122; 428/83; 428/358
[58] Field of Search ................... 52/716.8, 716.6; 49/490.1, 498.1; 428/122, 358, 83

[56] References Cited

U.S. PATENT DOCUMENTS

| | | |
|---|---|---|
| 4,188,765 | 2/1980 | Jackson . |
| 4,859,391 | 8/1989 | Jackson . |
| 4,937,126 | 6/1990 | Jackson . |
| 4,970,101 | 11/1990 | Keys ................... 428/122 X |
| 4,976,068 | 12/1990 | Keys . |
| 5,014,464 | 5/1991 | Dupuy et al. ........... 49/490.1 X |
| 5,095,656 | 3/1992 | Keys . |
| 5,437,124 | 8/1995 | Ahlfeld et al. ......... 49/490.1 X |

*Primary Examiner*—Robert Canfield
*Attorney, Agent, or Firm*—Harness, Dickey & Pierce, P.L.C.

[57] ABSTRACT

A flange cover for attachment to a vehicle includes a core member having a plurality of apertures therein. An elastomeric skin is disposed about the core member. Within the elastomeric skin is a longitudinally extending hollow cavity having an interior and an exterior edge, the interior edge being located between the core member and the exterior edge. A longitudinally extending rib projects from the exterior edge of the hollow cavity toward the interior edge of the hollow cavity.

7 Claims, 4 Drawing Sheets

FLANGE COVER WITH SMOOTH EXTERIOR SURFACE

BACKGROUND OF THE INVENTION

1. Technical Field

The present invention relates to flange or edge covers. More particularly, the present invention relates to door seals or glass run channels adapted for attachment to an automotive vehicle by means of the flange or edge covers.

2. Discussion

Door seals and glass run channels with flange covers are used in the manufacture of automotive vehicles. One method of manufacturing such flange covers uses a metal core in the form of a strip which is slotted to form a plurality of longitudinally spaced bands with apertures therebetween. The metal core is pre-formed into a predetermined configuration, such as a U-shape or a S-shape, and elastomeric material is then extruded about the pre-formed core. The elastomeric material may sink or fall in the apertures between the spaced metal bands. This presents an outer surface having a series of ridges, corresponding to the bands, and valleys, corresponding to the apertures. This condition is commonly referred to as the "hungry horse" effect or appearance. A similar "hungry horse" condition may also occur in a wire core flange cover, although generally to a lesser extent. The aesthetic appearance of a flange cover exhibiting "hungry horse" is not desirable since it does not provide a smooth continuous outer surface.

SUMMARY OF THE INVENTION

A flange cover for attachment to a vehicle includes a core member having a plurality of apertures therein. An elastomeric skin is disposed about the core member. Within the elastomeric skin is a longitudinally extending hollow cavity having an interior and an exterior edge, the interior edge being located between the core member and the exterior edge. A longitudinally extending rib projects from the exterior edge of the hollow cavity toward the interior edge of the hollow cavity.

DESCRIPTION OF THE PREFERRED EMBODIMENTS

Figure 1:
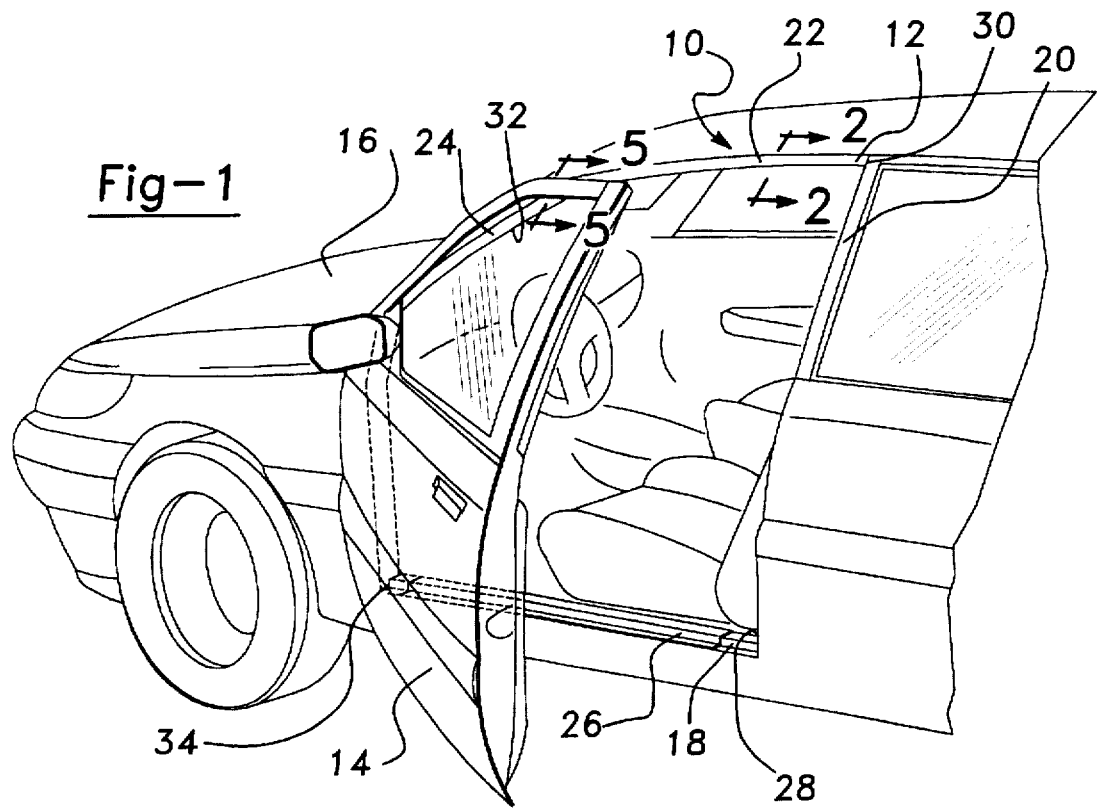
FIG. 1 is a partial elevational view of an automotive vehicle having a preferred embodiment of a flange cover made in accordance with the teachings of the present invention.
Figure 2:
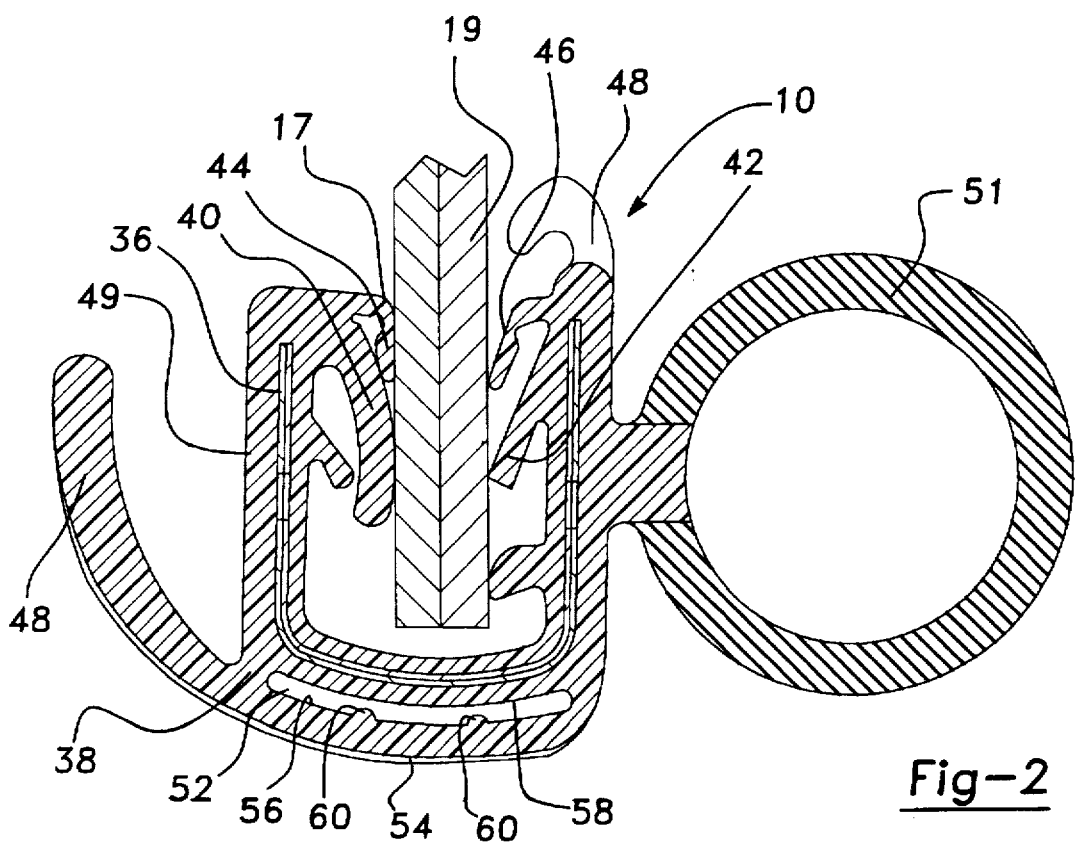
FIG. 2 is a sectional view taken along line 2—2 of FIG. 1 showing the flange cover of FIG. 1.

Referring now to FIG. 1 of the drawings, there is shown a preferred embodiment of a flange cover of the present invention indicated generally by the numeral 10. Flange cover 10 is installed in door aperture 12 of door 14 of automotive vehicle 16. Flange cover 10 is an elongated assembly which generally extends around the entire periphery of door aperture 12. Flange cover 10 provides an open end 17 for receiving a flange 19 as shown in FIG. 2. Alternately, flange cover 10 may extend from a rearward portion of rocker panel 18 upward along B pillar 20 to header 22 and downward along A pillar 24 and returning to a forward portion of rocker panel 18. In such case, a separate seal is generally provided either along a lower edge of door 14, or along sill plate 26. Under either condition it is contemplated that at corners 28, 30, 32, or 34 flange cover 10 can be formed by a miter or a butting arrangement, as is conventional in the art.

As shown in FIG. 2, a sectional view taken along line 2—2 in FIG. 1, flange cover 10 includes an elongated metal structure core member 36, comprised of aluminum, steel, or other suitable metal, extending the full longitudinal length of flange cover 10. An elastomeric extruded skin 38 covers substantially all of core member 36. Integrally incorporated within skin 38 are retention members 40 and 42, and sealing members 44, 46, and 47. In the preferred embodiment an interior extending decorative lip 48 is included in skin 38. Decorative lip 48 generally interfaces with interior trim components (not shown) such as an A pillar trim panel, a B pillar trim panel, or a cowl panel trim. Alternately, decorative lip 48 may be removed and the longitudinally extending hollow cavity 52 may be positioned along a leg portion 49 of flange cover 10. As such, the interior trim components (listed above and not shown) would interface with the exterior surface 54 of skin 38. A sealing bulb 51 may also attached to skin 38 in a preferred embodiment of the present invention.

Formed within skin 38 is a longitudinally extending hollow cavity 52 which is positioned between core member 36 and an exterior surface 54 of skin 38. Cavity 52 is generally parallel to exterior surface 54 and has an exterior edge 56 and an interior edge 58. Interior edge 58 is located between core member 36 and exterior edge 56. Ribs 60 project from the exterior edge 56 into cavity 52 and toward the interior edge 58 of cavity 52 and extend the longitudinal length of flange cover 10.

Figure 3:
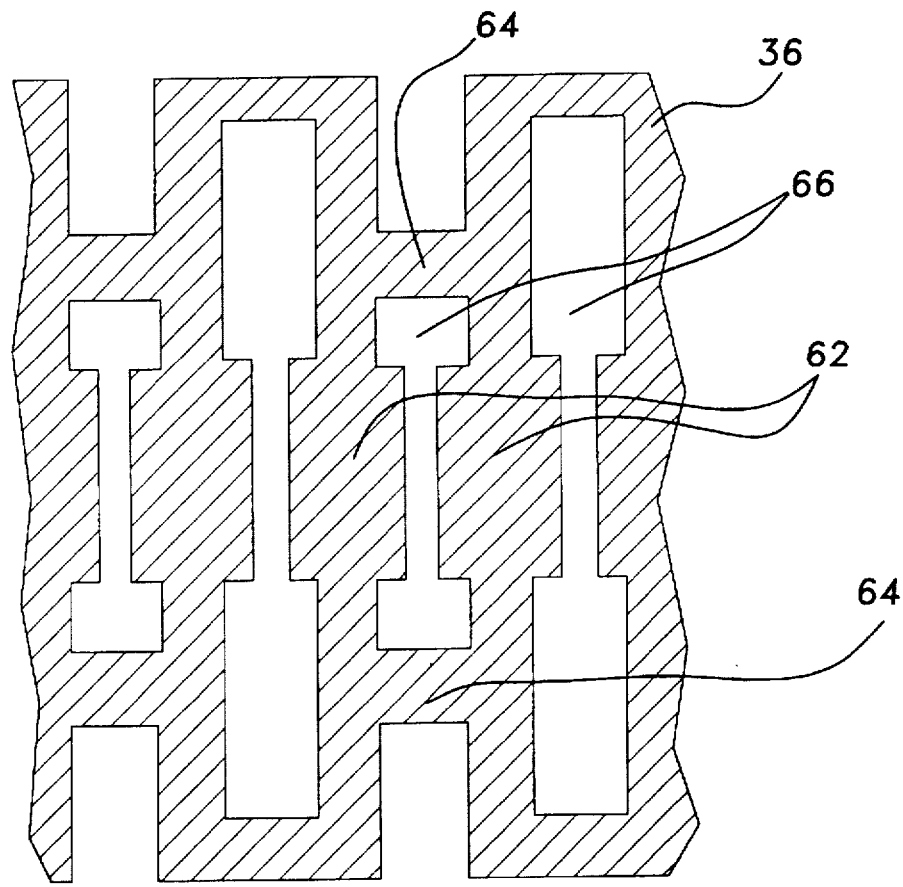
FIG. 3 is a plan view of the metallic core used in making the preferred embodiment of FIGS. 1 and 2, prior to pre-forming the core.

Referring now to FIG. 3, there is shown a plan view of core member 36 prior to roll forming to a predetermined configuration, as is common in the art. As previously noted, core member 36 is generally comprised of a metallic strip of material. Core member 36 is formed such that a plurality of bands 62 are spaced from one another and connected by web 64, thereby creating a plurality of apertures 66 between each pair of bands 62.

Figure 5:
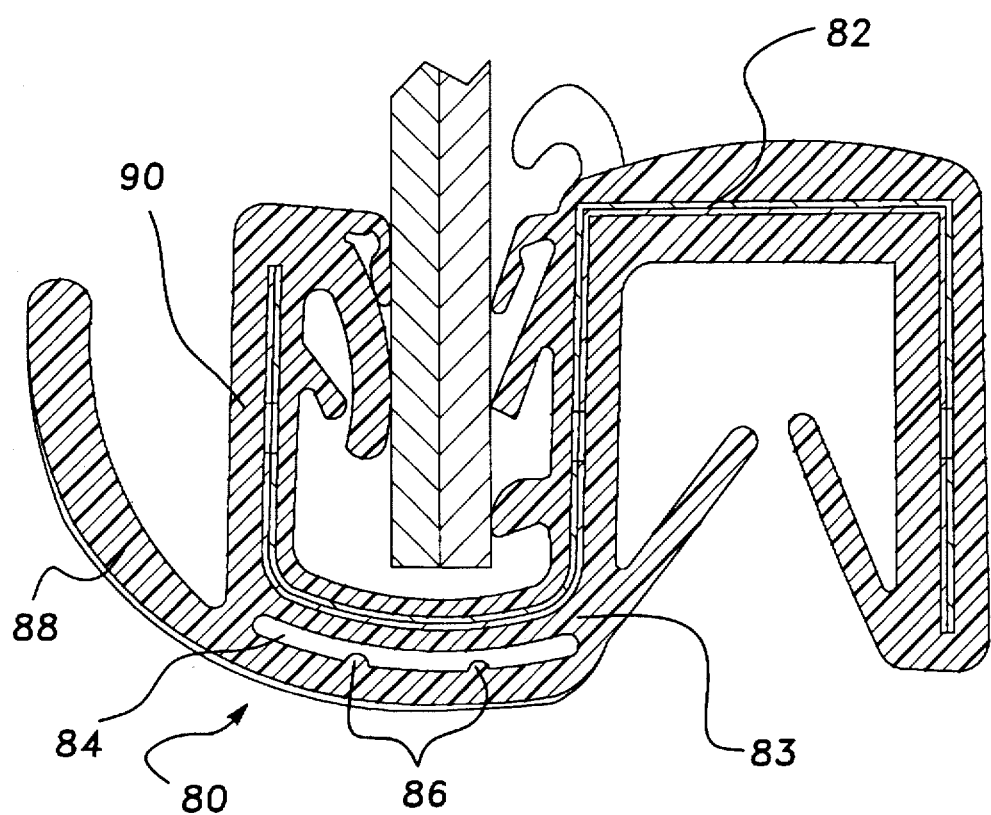
FIG. 5 is a sectional view taken along line 5—5 of FIG. 1 showing an alternate preferred embodiment of a flange cover made in accordance with the teachings of the present invention.
Figure 6:
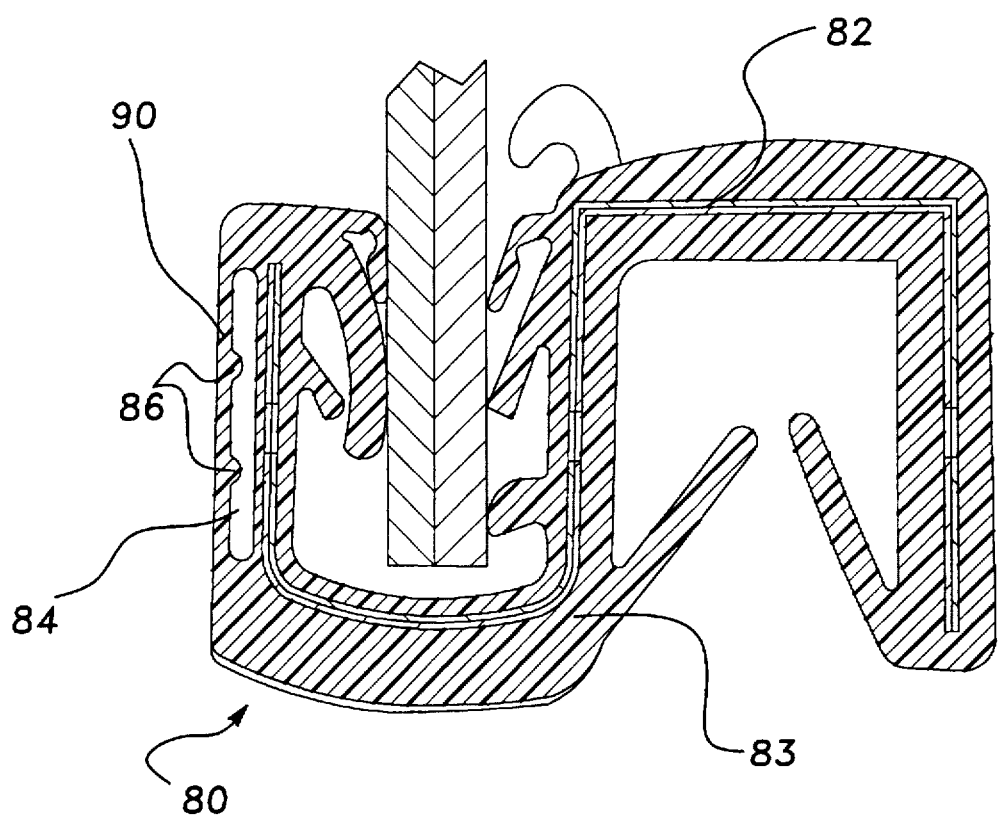
FIG. 6 is a sectional view of an alternative embodiment wherein the longitudinally extending cavity is positioned along a leg portion of the flange cover.

Core member 36 is generally pre-formed prior to extruding skin 38 about its surface. Core member 36 is pre-formed by passing the flat core through a series of roll forms, thereby providing a generally U-shaped configuration (as shown in FIG. 2) or a S-shaped configuration (as shown in FIG. 5). Once core member 36 is in the appropriate predetermined configuration, skin 38 is extruded around core member 36. Alternately, it is at times beneficial for manufacturing purposes to extrude skin 38 around core member 36 prior to roll forming. In such a case, flange cover 10 is roll formed as an assembly to the desired configuration. The "hungry horse" condition can be experienced regardless of whether the core is pre-formed prior to the extrusion of skin 38 or flange cover 10 is formed to the desired configuration as an assembly after skin 38 is extruded around core member 36.

The purpose of hollow cavity 52, and more particularly ribs 60, is to provide a gap between that portion of skin 38 which is in contact with the apertures 66, and thus subject to the "hungry horse" condition, and the exterior surface 54 of skin 38. By providing such a gap the valleys and ridges which are typical in the "hungry horse" condition cannot be observed on the exterior surface 54 of skin 38. This provides an improved aesthetic appearance for that portion of flange cover 10 which is visible when it is installed in the vehicle.

Ribs 60 provide a minimal contact surface with interior edge 58 of cavity 52 during processing. If ribs 60 are not provided, a large surface of exterior edge 56 would fall into contact with interior edge 58 while skin 38 is warm and still semi-pliable following extrusion. When this contact occurs the "hungry horse" condition may be transferred to and read on exterior surface 54. By incorporating ribs 60 on the exterior edge 56 of hollow cavity 52, additional operations, such as forcing air into cavity 52, are not required to keep exterior edge 56 from contacting interior edge 58. Thus by incorporating ribs 60 additional operations generally required to prevent exterior edge 56 from contacting interior edge 58 are avoided and a reduction in time, money, and complexity may be achieved.

Figure 4:
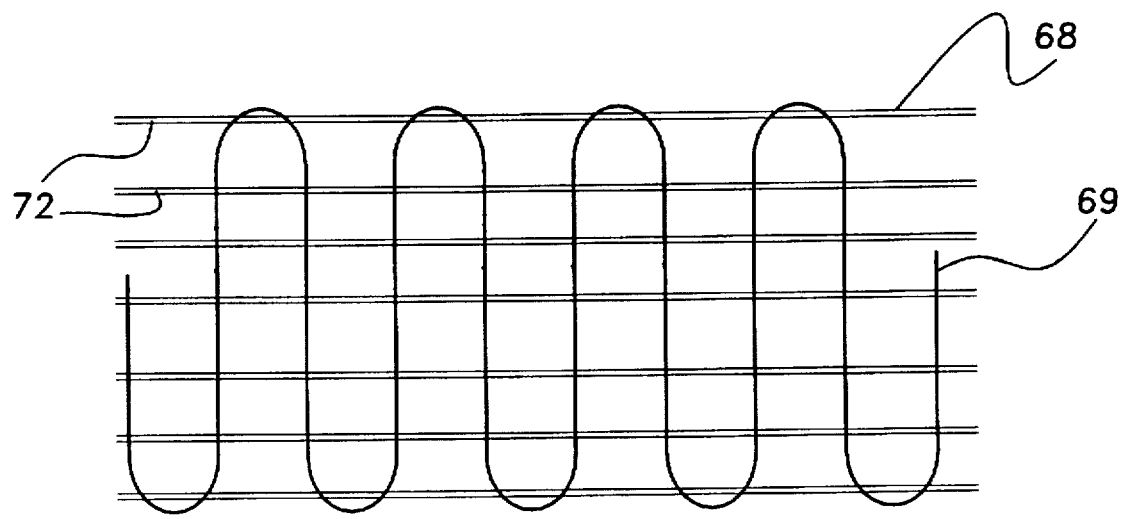
FIG. 4 is a plan view of an alternate metallic core which may be used in the present invention.

Referring now to FIG. 4, there is shown an alternate wire core member 68 comprised of wire 69 as opposed to a series of metal bands as in the first disclosed embodiment. The wire core 68 is generally constructed of a continuous wire 69 which serpentines across the width of the core 68 and runs the length of the core 68 as shown. Several fiber or wire strands 72 are positioned across the width of the core 68 and stabilize the serpentine formed wire 69 while at the same time not adversely effecting the flexibility of the core 68 when completed.

The ridges and valleys typical of the "hungry horse" effect can also be experienced when utilizing wire core member 68, although the magnitude of the effect is generally reduced because of the small diameter of the wire 69 used in core 68. It is therefore contemplated that the teachings of the present invention can be incorporated in a flange cover utilizing a core member such as wire core member 68.

FIG. 5 depicts a sectional view taken along line 5—5 in FIG. 1 showing a glass run channel, generally at 80. A metal core member 82 is formed in a generally S-shaped configuration and includes bands and apertures similar to that shown in FIG. 3. Like the previously disclosed flange cover, the extruded skin 83 of glass run channel 80 may be susceptible to the "hungry horse" condition. As such, it is contemplated that a longitudinally extending hollow cavity 84 be incorporated in glass run channel 80. Hollow cavity 84 would again incorporate ribs 86 which function in the same fashion as ribs 60 previously disclosed.

The glass run channel 80 may have a decorative lip 88 incorporated in or attached to skin 83. Alternately, decorative lip 88 may be removed and the longitudinally extending hollow cavity 84 may be positioned along a leg portion 90 of glass run channel 80.

It is to be understood that the foregoing discussion discloses and describes exemplary embodiments of the present invention and is not intended to limit the scope of the invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. A flange cover for attachment to a vehicle flange comprising:

a core member having apertures therein; and an elastomeric skin disposed about said core member, said skin having a longitudinally extending hollow cavity located between an outer surface of said skin and said core member, wherein said hollow cavity has at least one longitudinally extending rib projecting from an exterior edge of said hollow cavity toward an interior edge of said hollow cavity, said interior edge being located between said core member and said exterior edge.

2. The flange cover of claim 1 wherein said core member consists of a metallic strip of material formed with said apertures therein.

3. The flange cover of claim 1 wherein said core member consists of a wire.

4. The flange cover of claim 1 wherein said hollow cavity is disposed opposite an open end of said flange cover which is adapted to receive a flange.

5. The flange cover of claim 1 wherein said hollow cavity is disposed along a leg portion of said flange cover.

6. The flange cover of claim 1 wherein said flange cover is a glass run channel.

7. The flange cover of claim 6 wherein said hollow cavity is disposed along a leg portion of said glass run channel.

* * * * *